United States Patent
Heide et al.

(10) Patent No.: US 7,242,259 B2
(45) Date of Patent: Jul. 10, 2007

(54) ACTIVE BACKSCATTER TRANSPONDER, COMMUNICATION SYSTEM COMPRISING THE SAME AND METHOD FOR TRANSMITTING DATA BY WAY OF SUCH AN ACTIVE BACKSCATTER TRANSPONDER

(75) Inventors: Patric Heide, Vaterstetten (DE);
Martin Nalezinski, München (DE);
Claus Seisenberger, Neufrannhofen (DE); Martin Vossiek, Hildesheim (DE)

(73) Assignee: Symeo GmbH, Munich (DE)

( * ) Notice: Subject to any disclaimer, the term of this patent is extended or adjusted under 35 U.S.C. 154(b) by 0 days.

(21) Appl. No.: 10/506,885

(22) PCT Filed: Feb. 24, 2003

(86) PCT No.: PCT/DE03/00582

§ 371 (c)(1),
(2), (4) Date: Sep. 7, 2004

(87) PCT Pub. No.: WO03/074887

PCT Pub. Date: Sep. 12, 2003

(65) Prior Publication Data

US 2005/0170797 A1    Aug. 4, 2005

(30) Foreign Application Priority Data

Mar. 7, 2002    (DE) ............... 102 10 037

(51) Int. Cl.
*H03B 1/00*    (2006.01)
(52) U.S. Cl. ............. 331/74; 331/10; 455/196.1; 340/505

(58) Field of Classification Search ......... 331/74, 331/10; 340/10.1, 505; 455/10.1, 196.1
See application file for complete search history.

(56) References Cited

U.S. PATENT DOCUMENTS

| 3,175,834 | A | 3/1965 | Wallace et al. |
| 4,786,903 | A | 11/1988 | Grindahl et al. |
| 6,894,572 | B2 * | 5/2005 | Heide et al. ........... 331/74 |
| 2002/0114307 | A1 | 8/2002 | Apneseth et al. |
| 2004/0108904 | A1 | 6/2004 | Heide et al. |

FOREIGN PATENT DOCUMENTS

WO    WO 02/03096    *    1/2002

OTHER PUBLICATIONS

English-language copy of the International Search Report for PCT Application PCT/DE03/00494 upon which this application is based, mailed Jul. 9, 2003.

* cited by examiner

*Primary Examiner*—Arnold Kinkead
(74) *Attorney, Agent, or Firm*—Schiff Hardin LLP

(57) ABSTRACT

The invention relates to a device, especially an active backscatter transponder, for generating an oscillator signal based on a base signal. It comprises an oscillator for actively constructing the oscillator signal by oscillations, an input for the base signal and an output for the oscillator signal produced. The oscillator can be induced by the base signal to generate oscillator signal in a quasi-coherent manner to the base signal. For the transmission of data, the device further has a data insertion device for inserting data or a data signal into the oscillator signal. A corresponding suitable receiver receives and processes the received signal that was generated and transmitted by such a device as a quasi-coherent signal. A separation device removes the signal portions of the oscillator from the received signal via the base signal of a receiver-side oscillator, with a data retrieval device for retrieving the inserted data.

10 Claims, 3 Drawing Sheets

ACTIVE BACKSCATTER TRANSPONDER, COMMUNICATION SYSTEM COMPRISING THE SAME AND METHOD FOR TRANSMITTING DATA BY WAY OF SUCH AN ACTIVE BACKSCATTER TRANSPONDER

BACKGROUND

The invention relates to a backscatter transponder for generating an oscillator signal based on a base signal with an oscillator for actively constructing the oscillator signal by means of oscillations, an input for the base signal and an output for the oscillator signal generated, whereby the oscillator is rendered capable of being activated in a quasi-phase-coherent manner with the aid of a control signal generated by a clock generator and is capable of being activated in a quasi-phase-coherent manner with respect to the base signal by means of the base signal for generating the oscillator signal.

The invention also relates to a communication system incorporating such a backscatter transponder and/or a method for transmitting data with such a backscatter transponder.

Methods and arrangements for exchanging data and for measuring the distance from a base station to a modulated transponder exist in numerous forms and have been known for a long time. Customary transponders comprise what are referred to as "backscatter transponders", for example, which do not have their own signal source but instead simply reflect back the received signal (where relevant, in amplified form). Reference is also made in this context to "modulated backscatter".

Although the backscatter transponder constitutes the data transmitter, a dedicated radio frequency signal is not customarily generated in a backscatter transponder. A radio frequency auxiliary carrier signal is sent first from the actual data receiver station to the transponder, which this transponder sends back, usually with low-frequency modulation.

The critical advantage of communication systems based on backscatter transponders with respect to standard communication systems having separate signal sources in all sub-stations therefore consists in the fact that the signal received in the receiver can be restricted to the modulation bandwidth in a virtually optimal manner via mixing with the auxiliary carrier signal and therefore a virtually optimal signal-to-noise ratio is achieved.

With the separate signal sources in the transmitter and receiver which are otherwise customary in communication systems, it is generally not possible, or only with great effort, particularly in the case of lower data rates, to regulate the separate sources in such a precise manner with respect to frequency and phase that a comparably small receiver bandwidth would be achievable.

The critical disadvantage of backscatter transponder systems, however, is the fact that the radio frequency signal has to travel along the path from the receiver to the transponder and back and therefore, based on the radar equation, the signal-to-noise ratio (SNR) for the overall transmission link decreases in proportion to the 4th power of the distance. Due to free field attenuation which increases strongly with frequency, it is scarcely possible to implement very high-frequency backscatter transponders in the GHz range, particularly with a satisfactory signal-to-noise ratio.

If, as is customary in the case of standard communication systems, a data signal is generated in the data transmitter, particularly in the transponder, with a dedicated source, the RF signal travels along the transmitter/receiver path only once. In this case, the SNR is only inversely proportional to the square of the distance. Added to this is the fact that other attenuation/losses on the transmission path also only affect the signal once and not twice. Therefore, particularly in the case of larger distances, the SNR is orders of magnitude higher in this respect than in the case of simple backscatter systems.

A device for generating an oscillator signal based on a base signal having an oscillator for actively constructing the oscillator signal via oscillations, an input for the base signal and an output for the oscillator signal generated is known from German patent document DE 100 32 822 A1 in which the oscillator is capable of being activated by the base signal to generate the oscillator signal in a quasi-phase-coherent manner with respect to the base signal. In this respect, the device comprises particularly a transmitter in the form of a transponder and provides an oscillator connected to the transponder antenna. A clock control unit is additionally provided for activating the oscillator. The oscillator is switched on and off cyclically with the clock control unit via a clock control signal. In this respect, the signal generated by the oscillator is quasi-coherent with respect to the received base signal. Switching the oscillator on and off also switches its quasi-phase-coherent activation capability.

SUMMARY

The object of the invention comprises providing a variant of a device and/or a communication system with such a device and a method for transmitting data with such a device in terms of the scope of application.

This object is achieved by a transceiver device configured for generating an oscillator signal based on a base signal, comprising: an input configured for receiving the base signal; an output configured for transmitting the oscillator signal generated; an oscillator configured for actively constructing the oscillator signal with oscillations, the oscillator configured to be activated in a quasi-phase-coherent manner aided by a control signal generated by a clock generator and configured to be activated in a quasi-phase-coherent manner with respect to the base signal via the base signal for generating the oscillator signal; the device being usable as a receiver if the oscillator is not modulated by the clock generator, and the device being usable as a transmitter if the oscillator is modulated by the clock generator in its quasi-phase-coherent activation capability and in at least one of its amplitude, phase, and frequency.

This object is further achieved by a receiver device configured for receiving and processing a quasi-phase-coherent received signal which was generated and transmitted the device of the previous paragraph, comprising: a separation apparatus configured for removing signal components of an oscillator from the quasi-phase-coherent received signal by using a base signal of a receiver-side oscillator; and a data recovery apparatus configured to recover inserted data.

This object is further achieved by a demodulator for the receiver device of the previous paragraph, comprising a phase comparator, the phase comparator comprising: an input to which a received signal originating from the mixer of the receiver is fed; a further input; and an output at which recovered data is output; the demodulator further comprising: a frequency discriminator configured to impose a frequency-dependent phase shift on an input signal, comprising: an input to which the received signal originating from the mixer of the receiver is fed; and an output connected to the further input of the phase comparator at which an output signal of the frequency discriminator is fed.

This object is further achieved by a transponder system, comprising: at least one transmitter; at least one receiver; the transponder system configured to determine a distance between the transmitter and the receiver by using a base signal transmitted from the receiver to the transmitter and a signal transmitted back from the transmitter to the receiver which is quasi-phase-coherent with respect to the base signal, at least one of the following being provided in the transmitter or the receiver: a data insertion apparatus which is adapted for inserting data or a data signal into a corresponding oscillator signal to be transmitted; and a data recovery apparatus configured to recover data inserted into received signals.

This object is further achieved by a method for transmitting data, comprising: generating an oscillator signal based on a base signal; activating an oscillator in a quasi-phase-coherent manner with respect to the base signal by way of the base signal; oscillating the oscillator in response to the activation, the oscillator actively generating a quasi-phase-coherent oscillator signal to be transmitted by way of the oscillation; and inserting data or a data signal in the quasi-phase-coherent oscillator signal to be transmitted during or following its generation.

Finally, this object is further achieved by a method for transmitting data with a device for generating an oscillator signal based on a base signal, comprising: actively constructing an oscillator signal with an oscillator configured to actively constructing the oscillator signal by way of oscillations; inputting the base signal at an input; outputting the oscillator signal at an output; generating a control signal by a clock generator; activating the oscillator in a quasi-phase-coherent manner with the aid of the control signal with respect to the base signal by way of the base signal for generating the oscillator signal; and switching the device between use as a receiver and as a transmitter; when the device is used as a receiver, not modulating the oscillator by the clock generator; and when the device is used as a transmitter, modulating the oscillator by the clock generator in its quasi-phase-coherent activation capability and in at least one of its amplitude, phase, and frequency.

According to the various embodiments of the invention discussed below, a novel active backscatter transponder and a communication system are presented which combine the advantages of various systems, i.e., make use particularly of the simple achievement of a virtually optimally small receiver bandwidth and a square-law dependency of the SNR on the distance. Furthermore, constructional solutions are provided which allow a particularly favorable implementation of the arrangement for transmitting data known as such from German patent document DE 100 32 822 A1.

Correspondingly, a device, particularly an active backscatter transponder or backscatter transponder, for generating an oscillator signal based on a base signal with an oscillator for actively constructing the oscillator signal via oscillations, an input for the base signal, and an output for the oscillator signal generated, whereby the oscillator is capable of being activated by the base signal to generate the oscillator signal in a quasi-phase-coherent manner with respect to the base signal, is advantageously equipped if it also provides a data insertion apparatus which is adapted to insert data or a data signal into the quasi-phase-coherent oscillator signal.

The data insertion apparatus advantageously comprises a clock generator, the clock pulse sequence of which is derived from the data to be inserted, and which activates the oscillator to produce a fundamental oscillation mode onto which the data is modulated. A data insertion apparatus which is adapted as a phase control apparatus, which modulates the data onto the oscillator signal by using a switchable phase shift, is also possible for inserting data, for example.

For the purposes of processing such a quasi-phase-coherent signal with inserted data received as a received signal, a device, particularly a receiver, which is appropriate, provides a separation apparatus for removing the signal components of the transmitter-side oscillator from the quasi-phase-coherent received signal by using a base signal of a receiver-side oscillator and a data recovery apparatus for recovering the inserted data.

Such a receiver is particularly advantageously equipped with a transmission mixer which provides an input for applying the signal generated by the oscillator, an output for outputting that signal as a base signal through the transmission mixer and for transmitting the base signal to an actual data transmitter station, an input for applying the received signal, and an output for outputting the mixed-down received signal, where particularly the output for outputting the base signal and the input for the received signal can coincide.

A device, particularly a transceiver in the form of a combined apparatus, which is capable of being employed as a transmitter and/or receiver depending on the purpose of use, is capable of being employed in a particularly variable manner. Such a transceiver expediently provides an oscillator for generating an oscillating signal, a clock generator for activating the oscillator, a mixer with an input for applying the oscillating signal of the oscillator, at least one interface for transmitting and/or receiving signals where the interface is connected to the mixer, at least one output of the mixer for outputting a signal received by way of the interface and mixed down with the oscillating signal, and a signal and data processing apparatus connected to the mixer.

In this respect, the signal and data processing apparatus is adapted in the form of a structural unit or a plurality of structural units and is used optionally either for applying a received base signal to the oscillator and inserting data or a data signal into the oscillating signal for subsequent output by way of the interface as the data insertion apparatus or for recovering the inserted data from a signal received by way of the interface and mixed down by way of the mixer as the data recovery apparatus.

The most diverse demodulators are capable of being employed in the receivers, particularly a demodulator with a phase comparator and a frequency discriminator for imposing a frequency-dependent phase shift on the signal, to both of which the received signal originating from the mixer is fed, where the output signal of the frequency discriminator is fed to a further input of the phase comparator, the output of which phase comparator outputs the recovered data.

A further advantageous example comprises the employment of a demodulator with at least two different bandpass filter/detector sequences, the outputs of which are applied to both an adder for outputting a measure for the signal level and also a differential amplifier followed by a series-connected comparator for outputting the reconstructed data.

Transponder systems which operate with such quasi-phase-coherent signals can also be used advantageously for transmitting data. In this respect, such a transponder system can enable the transmission of data in only one of the two directions or even in both directions. Such a transponder system provides, in a very complex form with at least one transmitter and at least one receiver in each case for determining the distance between the transmitter and the receiver by using a base signal transmitted from the receiver to the transmitter and a signal transmitted back from the transmitter to the receiver which is quasi-phase-coherent with respect to the base signal, correspondingly provided in the transmitter or the receiver, a data insertion apparatus which is adapted for inserting data or a data signal into the corresponding oscillator signal to be transmitted and/or a data recovery apparatus for recovering data inserted into received signal.

A corresponding receiver for such a distance-determining transponder system expediently provides a demodulator for recovering original data, a measuring apparatus for determining the distance between the transmitter and the receiver, an oscillator, which comprises a variable oscillator with regard to frequency, with which frequency-modulated signals suitable for measuring distance are capable of being generated, and a receiver mixer which is designed for mixing received signals with signals of the oscillator and which provides an output for outputting signals resulting therefrom, where the output is connected to the demodulator and the measuring apparatus.

For the purposes of operating these devices and systems, a method for transmitting data is appropriate where a signal is generated with the aid of an oscillator which is rendered capable of being activated in a quasi-phase-coherent manner via at least one control signal/clock signal. The oscillator rendered capable of being activated in such a way is then activated to produce oscillations in a quasi-phase-coherent manner in such a way by a received base signal that the signal generated oscillates in a quasi-phase-coherent manner with respect to the base signal. A data signal is imposed on this quasi-phase-coherent signal during or following its generation.

DESCRIPTION OF THE DRAWINGS

In the following, exemplary embodiments are explained in detail with reference to the drawing figures.

DETAILED DESCRIPTION OF THE PREFERRED EMBODIMENTS

Figure 1:
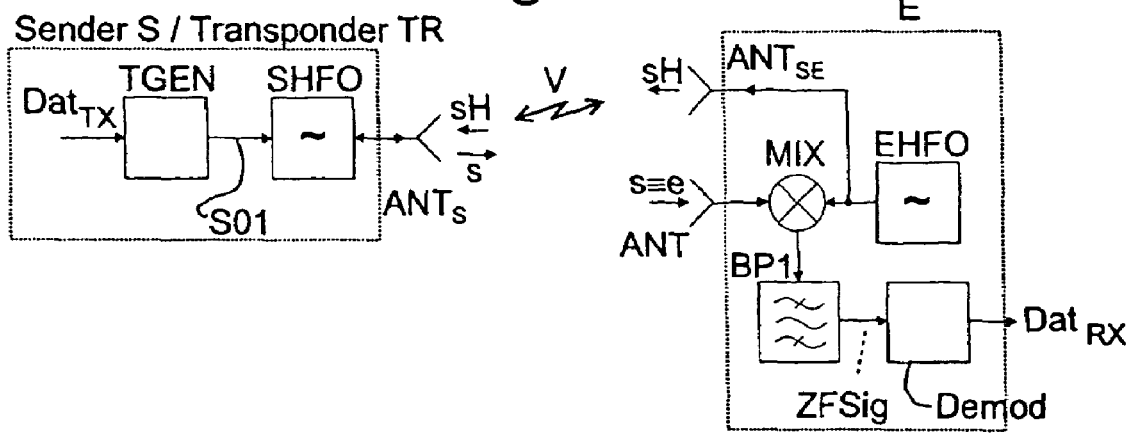
FIG. 1 is a block diagram showing an arrangement of a transmitter and a receiver where the signal of the transmitter oscillates in a quasi-phase-coherent manner with respect to signals of the receiver and data is transmitted from the transmitter to the receiver.

FIG. 1 shows the basic principle of the underlying arrangement. The basic elements of the arrangement are known and explained in German patent document DE 100 32 822 A1.

As can be seen from FIG. 1, an exemplary arrangement comprises a transmitter S and a receiver E. The transmitter S generates data $Dat_{TX}$ which is to be transmitted with a signal s by way of an interface V, particularly a radio interface, to the receiver E.

In the receiver E, an auxiliary carrier signal sH is generated with the aid of a receiver-side oscillator EHFO and, in the example shown, transmitted by using corresponding antennas $ANT_{SE}$ and $ANT_S$ by way of the interface V to the transmitter S.

In the transmitter S, a signal s is generated by using a transmitter-side active oscillator SHFO which signal oscillates in a quasi-phase-coherent manner with respect to the received auxiliary carrier signal sH and onto which the data to be transmitted $Dat_{TX}$ is or was modulated.

On the transmitter side, the auxiliary signal sH of the receiver E which was generated with the oscillator EHFO and transmitted by way of the antenna $ANT_{SE}$ is received with the antenna $ANT_S$. The oscillator SHFO is switched on and off cyclically with a clock control unit TGEN as a function of the data stream $Dat_{TX}$ by way of the signal S01. In the case of suitable selection of the signal S01 and application of the auxiliary carrier signal sH, the signal s generated by the oscillator SHFO is then, as known and described in German patent document DE 100 32 822 A1, quasi-coherent or quasi-phase-coherent with respect to the auxiliary carrier signal sH.

The signal s generated in the transmitter S, particularly a transponder, is transmitted back to the receiver and received by this receiver with the antenna ANTE. The signal e received in the receiver E, which corresponds to the transmitter signal s apart from influences during transmission, is mixed with a component of the signal generated continuously by the oscillator EHFO in the mixer MIX. Mixed components of no interest and/or interference signal and noise components are suppressed with a filter BP1 which is preferably connected in series after the output of the mixer MIX. This filter BP1 is preferably implemented as a bandpass filter where the center frequency and the bandwidth of the filter should be matched to the clock signal of TGEN.

The transmitter S provides the oscillator SHFO connected to the antenna $ANT_S$. The clock control unit TGEN is additionally provided for activating the oscillator SHFO. The oscillator SHFO is alternately switched on and off and rendered capable of activation in a quasi-phase-coherent manner with the clock control unit by way of the signal S01. The signal s generated by the oscillator SHFO is generated in a quasi-coherent manner with respect to the auxiliary carrier signal sH by applying the received auxiliary carrier signal sH. Switching the oscillator SHFO on and off also switches its quasi-phase-coherent activation capability.

The oscillator SHFO is advantageously adapted in such a way that on the one hand, it is not activated to oscillate by thermal noise, and on the other hand, the received or auxiliary carrier signal sH injected into it is sufficient to activate quasi-phase-coherent oscillations with respect to the auxiliary carrier signal sH. In this respect, quasi-phase-coherent also particularly means that the phase difference between the auxiliary carrier signal and the generated comparison signal remains small during a turn-on period of the signal S01 where the term "small" must be seen in relation to the intended communication or measuring task. The value $\Pi/10$, that is to say approx. 20°, can be used as the limit for a small phase divergence, for example. Such signals with only small phase divergences are described here as quasi-phase-coherent and the period of time in which this coherence exists as the coherence period.

It is appropriate in this respect that not only are the oscillations of the active oscillator SHFO quasi-phase-coherent with respect to the auxiliary carrier signal sH but that the activation of the active oscillator SHFO already takes place in a quasi-phase-coherent manner. A relatively large component of a received or auxiliary carrier signal sH is therefore coupled to the oscillator SHFO in the transmitter S which is preferably adapted as a transponder TR. This preferably constitutes an electrical auxiliary carrier signal and a corresponding oscillator signal.

But an arrangement using optical, acoustic or other signals is also capable of being implemented in principle. The received or auxiliary carrier signal sH activates the oscillator SHFO in a quasi-phase-coherent manner to produce oscillations, with the result that this oscillator generates an oscillator signal which is coupled out of the oscillator as the signal s and is derived by way of an output. The input for the received or auxiliary carrier signal sH and the output of the oscillator signal can be wholly or partly identical. But they can also be implemented separately from each other.

The signal s generated in the transmitter S is transmitted back to the receiver E by using the antenna $ANT_S$ and received by this receiver with the antenna $ANT_E$.

A basic idea in the exemplary embodiments is that not only are the oscillations of the active oscillator SHFO in the transmitter S quasi-phase-coherent with respect to the auxiliary carrier signal sH, but that the activation of the active oscillator SHFO already takes place in a quasi-phase-coherent manner. Whereas in the case of early devices and methods according to the state of the art, the activation of the active oscillator SHFO is effected by way of thermal noise, and its oscillations are only rendered quasi-phase-coherent later by way of a complex control process and what is referred to as "LockIn". In the present instance, the oscillator SHFO is already activated in a quasi-phase-coherent manner by way of the auxiliary carrier signal or already starts oscillating in a quasi-coherent manner and therefore phase coherence is immediately established automatically.

A basic idea is that an oscillator SHFO is in a delicate equilibrium in the basic state, and when it is switched on, it must then be activated to oscillate by way of an external energy supply of any nature. Only following this initial triggering does the feedback with which the oscillation is maintained become active. Thermal noise is customarily used for such an initialization of an oscillating circuit, for example. This means that an oscillator with a random phase and amplitude starts to oscillate and then oscillates at its frequency as defined by its resonant circuit.

However, if an external activation signal is injected into the oscillator during switching on, the frequency of which lies in the bandwidth of the resonant circuit and the power of which lies significantly above the noise power, the oscillator does not oscillate randomly, but synchronously with the phase of the activating base signal. Depending on the frequency difference between the activating auxiliary carrier signal sH and the oscillator signal and as a function of the phase noise of the two oscillators SHFO and EHFO in the transmitter S and in the receiver E, this quasi-phase-coherence continues to exist at least for a time.

The difference between the present design and the known passive devices and methods is in the use of an active oscillator SHFO in the transmitter S or transponder TR. Thus, the auxiliary carrier signal sH is not simply reflected back; instead, an oscillator signal s is actively constructed in a noise-free or virtually noise-free manner with a dedicated quasi-phase-coherent source before sending back. In this respect, given otherwise similar operation, the system therefore has a significantly greater range than passive backscatter transponder systems according to the state of the art.

In the case of transponder arrangements, a particular advantage is that no time, frequency, or polarization multiplexing whatsoever is necessary since the auxiliary carrier signal sH as the base signal and the oscillator signal s do not exert an influence on each other, or only exert an influence in the desired manner at the start of the initial oscillation response and, following this, are quasi-phase-coherent independently of each other.

It is advantageous if the device provides a switch TGEN for switching the quasi-phase-coherent activation capability of the active oscillator SHFO. This switch TGEN is used to put the active oscillator SHFO in a state from which it, being activated by the auxiliary carrier signal sH, can start to oscillate in a quasi-phase-coherent manner with respect to the auxiliary carrier signal sH.

The oscillations do not necessarily have to be switched on and off entirely for the purposes of switching the activation capability. If the active oscillator SHFO can oscillate with different modes, for example, a second mode can simply be switched while the first continues to oscillate. Even in the case of only one mode, the oscillation does not have to be switched off completely; instead, attenuation is sufficient as a rule with the result that the auxiliary carrier signal sH is sufficient for the next quasi-phase-coherent activation.

If the activation capability of the active oscillator SHFO is switched on again following the coherence period, the quasi-phase-coherence continues to exist for a lengthy period.

If the quasi-phase-coherent activation capability of the active oscillator is repeated cyclically in a development, the quasi-phase-coherence also continues to exist for lengthy periods. This can be achieved by the fact that the switch is adapted in such a way that it switches the active oscillator SHFO with a predefined clock pulse rate.

In this respect, the duration of the clock cycles of the clock pulse rate preferably corresponds roughly to the coherence period. But faster switching is also possible without the quasi-coherence between the base signal sH and the oscillator signal sH being lost.

If, conversely, the quasi-phase-coherence is only necessary in certain time intervals, the clock time can also be selected longer than the coherence period.

If the switching of the active oscillator SHFO is repeated cyclically and the active oscillator SHFO starts to oscillate cyclically in a quasi-phase-coherent manner with respect to the auxiliary carrier signal sH, the oscillator signal generated by the active oscillator can be regarded as a sampled duplicate of the auxiliary carrier signal sH.

According to the sampling theorem, a signal is completely described by its sampling values. Appropriately, the switch-off period of the active oscillator is not substantially longer than the switch-on period, i.e., not substantially longer than the coherence period. Observance of the sampling theorem is therefore an inherent result due to the coherence condition. In line with the sampling theorem, the phase difference between two sampling points must be smaller than 180°. This condition is less restrictive than the quasi-coherence condition. Consequently, from the information viewpoint, the signal s of the switched oscillator SHFO must be considered, in spite of the switching operation, to be a copy of the comparison signal or carries its complete information.

The activation capability of the active oscillator SHFO can be switched relatively simply if the oscillator SHFO itself is switched. Correspondingly, the device can provide a switch TGEN for switching the active oscillator SHFO on and off. Any switch which has the effect that the oscillation condition of the oscillator applies or no longer applies is suitable for switching the oscillator. Thus, for example, the amplification can be switched off, attenuation or propagation times (phases) changed, or the feedback branch interrupted in the oscillating circuit.

The active oscillator SHFO can be activated not only in its fundamental mode but also in a quasi-phase-coherent manner in one of its sub-harmonic oscillation modes. In this respect, the fundamental mode or a sub-harmonic oscillation mode of the base signal can be used for activation.

If the device is used for identification as an ID tag or for communication, the coding can be effected, for example, by the clock pulse rate and/or by way of an additional modulation unit such as a phase, frequency, or amplitude modulator with which the quasi-phase-coherent signal is modulated before sending back.

As previously outlined, the coherence period is dependent on the frequency difference between the base signal and the oscillator signal. The more exactly the frequencies coincide, the longer the phases of the signals are virtually identical. To increase the coherence period, as a result of which the clock pulse rate of the switch can also be kept small, it can be advantageous to provide mechanisms which are suitable for matching the oscillator frequency adaptively to the frequency of the base signal or auxiliary carrier signal sH.

As can be seen from the following description of individual exemplary embodiments, e.g. FIG. 1, the system shown differs from known earlier backscatter transponders primarily in that the signal s transmitted back in modulated form is not simply reflected back passively; instead, it is actively generated anew in a quasi-phase-coherent manner and transmitted back. The basic principles and implementation variants and also typical signal processing methods of standard backscatter transponders can therefore be transferred directly to the present arrangement principle. Some particular features arise in the implementation, however, which make particularly advantageous arrangements possible as follows.

On the transmitter side, data $Dat_{TX}$ is, for example, modulated directly onto the phase-coherent signal or, in the case of generation of a clock signal S01 for the oscillator SHFO, already incorporated into the clock signal S01.

In the receiver E, the modulated data $Dat_{TX}$ is demodulated out of the received signal e or s again. For this, the received signal e travels through the mixer MIX, for example, in which the influence of the underlying oscillator signal is taken out. Then bandpass filtering can be effected in the filter BP1, prior to its output signal ZFSig being fed to a demodulator Demod. The reconstructed data $Dat_{RX}$ is output at the output of the demodulator Demod.

Figure 2:
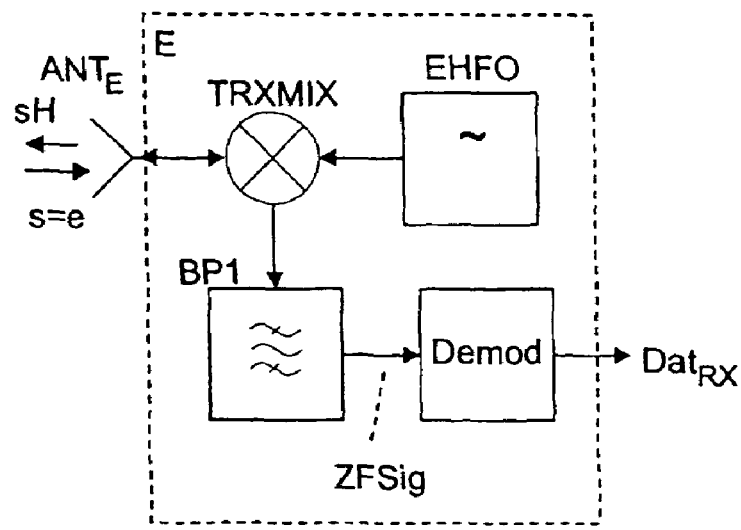
FIG. 2 is a block diagram showing an embodiment of a receiver illustrated by FIG. 1.

A receiver station E of the communication system encompasses particularly advantageously what is referred to as a "transmission mixer" TRXMIX. A possible embodiment of a receiver station E with a transmission mixer TRXMIX is shown in FIG. 2. The signal generated by the oscillator EHFO is transmitted as an auxiliary carrier sH through the transmission mixer to the actual data transmitter station S and at the same time is used to mix the modulated received signal e down into the baseband with the mixer TRXMIX. It can be seen that the advantageous method for transmitting data can be implemented with a transmission mixer TRXMIX with minimum device cost.

Figure 3:
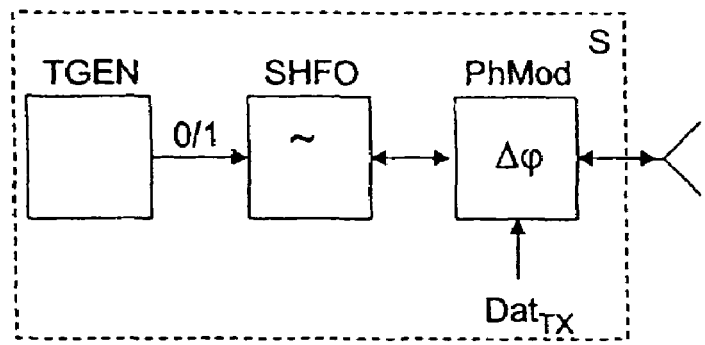
FIG. 3 is a block diagram showing an embodiment of a transmitter illustrated by FIG. 1.

FIG. 3 shows a further possible embodiment for achieving the modulation with a switchable phase shift by using a phase control element PhMod in the transponder S or TR. With the phase control element PhMod, both the base signal for quasi-phase-coherent activation and also the signal generated in a quasi-coherent manner could be phase-modulated. In this respect, the modulation of the clock pulse 0/1, necessary by virtue of the principle, of the clock generator TGEN is superimposed by the phase modulation.

Figure 4:
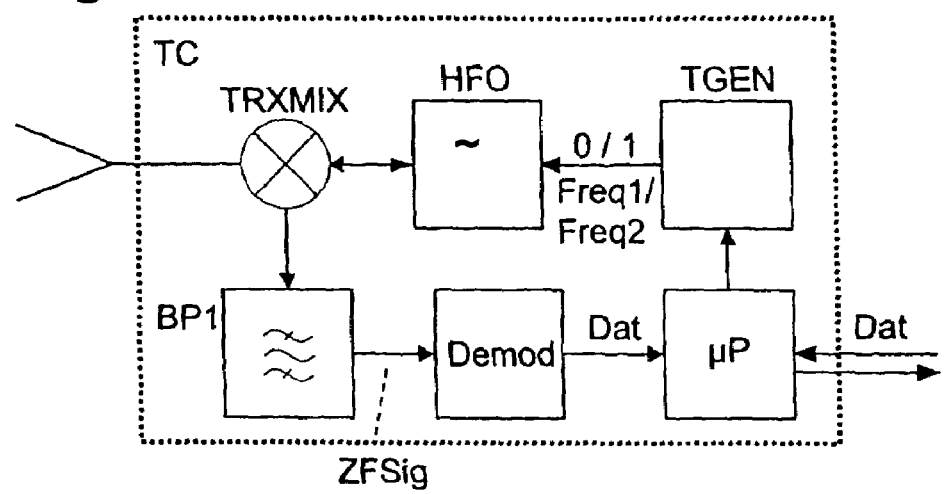
FIG. 4 is a block diagram showing a transceiver which is capable of being employed both as such a transmitter and also as such a receiver.

It is favorable in many applications to implement the base station being used as the receiver E and/or the transponder TR or transmitter S as a transceiver TC, i.e., in such a way that data can be transmitted in both directions between the stations. FIG. 4 shows a favorable implementation variant.

The arrangement comprises, for example, an antenna which is connected to the mixer TRXMIX. The mixer TRXMIX receives a base signal from an oscillator HFO. The oscillator in turn provides an input for an activation or trigger signal 0/1 which is fed from a clock generator TGEN. The mixer TRXMIX furthermore provides an output from which a signal received by way of the antenna and mixed down is output, to a bandpass filter BP1 in the first instance, for example. Its output signal ZFSig is in turn fed to a demodulator Demod which provides reconstructed data Dat at its output. This data can be output direct or preferably fed to a microprocessor µP for further processing.

The microprocessor µP can exert an influence on the generation of the oscillator signal with the aid of the data received or even by itself, by way of a connection to the clock generator TGEN, for example. The feeding of data to be transmitted by way of the microprocessor µP, the clock generator TGEN, the oscillator HFO or a phase modulator connected in series ahead of the mixer TRXMIX is also possible.

If the oscillator HFO is not modulated by the clock generator TGEN with the result that it generates a continuous uniform sine-wave signal, the station TC shown is used as the receiver E. If the oscillator HFO is modulated by the clock generator in its quasi-phase-coherent activation capability and in its amplitude, phase and/or frequency, the station TC shown is used as the transmitter S. Such a transceiver TC preferably encompasses the processor µP which is used either to generate the data stream or to analyze the received data Dat.

In principle, all types of modulation such as those that are also used otherwise in the case of customary passive backscatter transponders can be applied in the present system. However, a frequency-modulated amplitude modulation where only the frequency of the switching period is varied to encode the digital characters is particularly advantageous for the principle. The clock generator TGEN then generates a first switching frequency Freq1 for a digital "0" and a second switching frequency Freq2 for a digital "1", for example.

Apart from this binary FSK (Frequency Shift Keying) encoding, multi-stage encoding methods with more than 2 frequency stages are naturally also capable of being applied. The variation of the pulse/interval relationship in the case of a constant pulse or interval length can also be used for modulation. All methods of frequency modulation known as such can be used.

Figure 5:
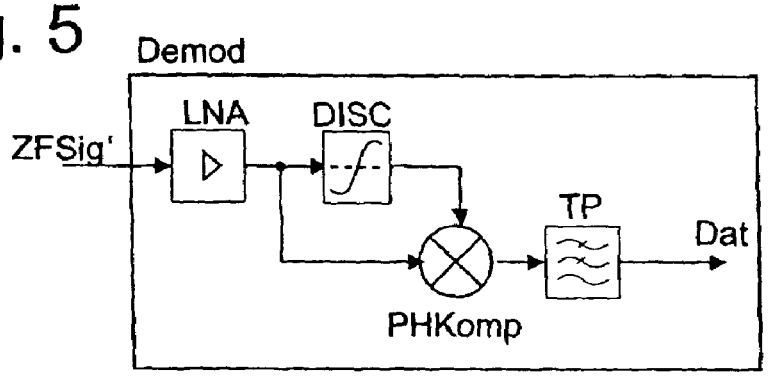
FIG. 5 is a block diagram showing a first employable demodulation apparatus.
Figure 6:
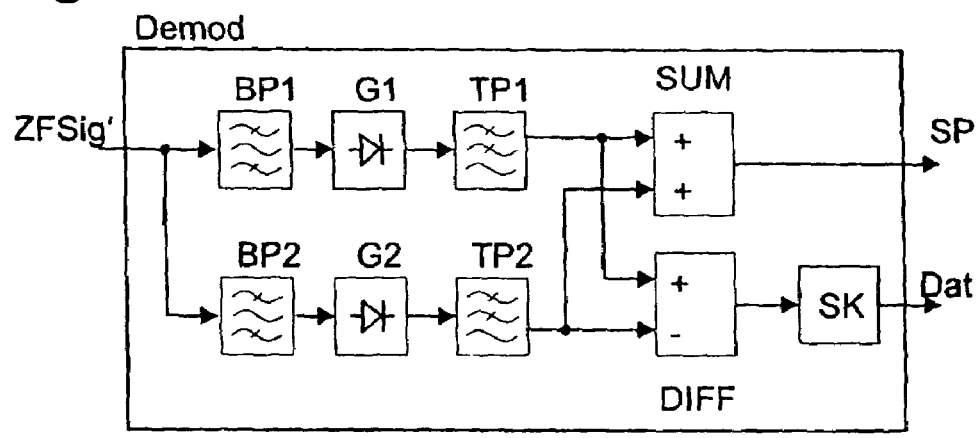
FIG. 6 is a block diagram showing a second employable demodulation apparatus.

FIGS. 5 and 6 show implementations of FSK demodulators which are known as such in terms of the principle but which can be used very advantageously in such arrangements.

In FIG. 5, the demodulator Demod provides a low-noise input amplifier LNA to which the signal ZFSig' is fed from the mixer or bandpass filter, for example. The signal preprocessed in this amplifier is fed both direct to a phase comparator PHKomp and also a frequency discriminator DISC. The output signal of the frequency discriminator DISC is fed to a further input of the phase comparator PHKomp. Its output signal is output from the demodulator Demod as a data stream Dat after traveling through a low-pass filter TP, for example.

In this respect, the frequency discriminator DISC is used to impose a frequency-dependent phase shift on the intermediate frequency signal ZFSig'. The frequency modulation can then be converted into a corresponding output voltage by way of phase comparison, in a mixer, for example, particularly the phase comparator PHComp. PLL circuits for frequency demodulation or other frequency-comparison arrangements are also capable of application for the method described here.

In FIG. 6, the intermediate frequency signal ZFSig' is transmitted by way of two different bandpass filter/detector sequences, for example. The two sequences comprise a bandpass filter BP1 or BP2, a rectifier G1 or G2 and a low-pass filter TP1 or TP2 in each case, for example. The output signals of these two sequences are fed to both an adder SUM and also a differential amplifier DIFF. Depending on the modulation frequency, either the one or the other filtered signal has a greater amplitude, which can be detected by way of the differential amplifier DIFF followed by a series-connected comparator SK, for example. The comparator SK outputs the reconstructed data Dat. The sum of the signals from the two filter branches constitutes a measure of the signal level SP.

The present method for transmitting data and the present arrangements can be employed or combined very well with distance-measuring transponder systems. Such transponder systems are described in the German patent application DE 101 55 251 "Transpondersystem und Verfahren zur Entfernungsmessung", (Transponder system and method for distance measuring) for example, to the full scope of which reference is made.

Figure 7:
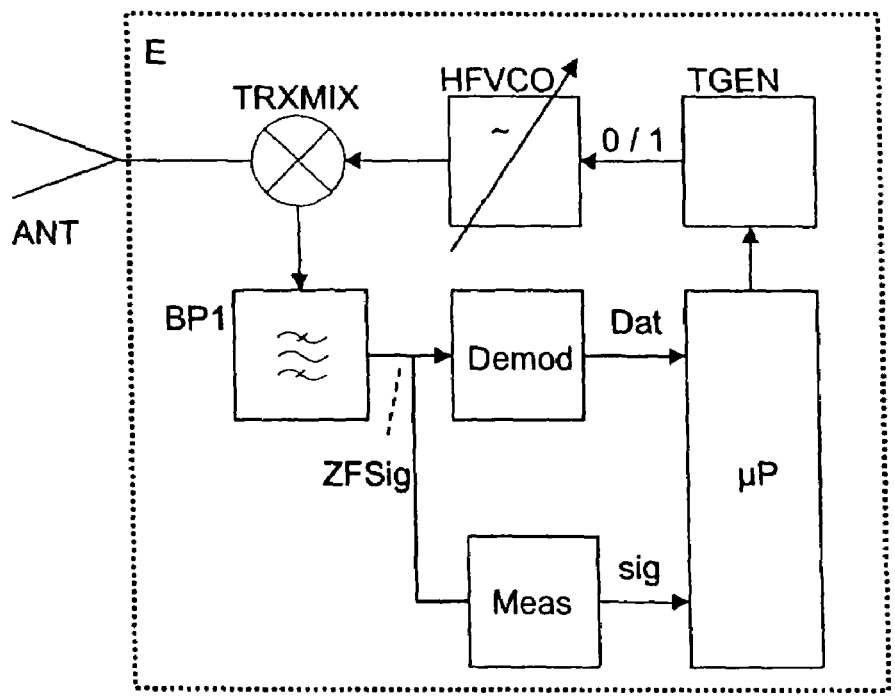
FIG. 7 is a block diagram showing such a receiver with additional apparatuses for determining the distance of a transmitter.

FIG. 7 shows the additions necessary to expand the functionality in the case of such a distance-measuring transponder system. In place of a fixed-frequency oscillator, an oscillator HFVCO is used here which is variable with regard to frequency and with which frequency-modulated signals suitable for measuring distance can be generated. After the receiver mixer TRXMIX, which is preferably implemented as a transmission mixer as shown, the intermediate frequency signal is then preferably divided into two sub-paths. The first demodulation path described above leads from the bandpass filter BP1 to the demodulator Demod and is used for accommodating or reconstructing data. The second, lower path leads, as a measuring path, to a measuring apparatus Meas where the intermediate frequency signal is processed for the purposes of distance measurement.

In this respect, a corresponding method is based on determining the distance between a base station E and at least one transponder (TR; S) where a signal sH or $s_{tx}(t)$ of a base station oscillator HFVCO is transmitted from the base station E, a phase-coherent signal with respect to this (s or $s_{osz}(t)$) is generated and transmitted by using an oscillating oscillator (SHFO) on the basis of the signal sH or $e_{rxt}(t)$ received from the base station in the transponder, the distance is determined on the basis of the phase-coherent signal (e or $s_{rx}(t)$) received from the transponder in the base station E and the oscillator for generating the phase-coherent signal is activated in a quasi-phase-coherent manner with the received signal. Added to this in the present instance is a data signal or data which is mixed into or modulated onto the signal of the transponder TP or transmitter S.

A corresponding distance-determining system for determining the distance between a base station E and at least one transponder (TR) where the base station E provides an oscillating signal source HFVCO for generating a signal and a transmission apparatus for transmitting the signal, the transponder provides a receiver apparatus for receiving the signal from the base station, an oscillator for generating a phase-coherent signal with respect to this and a transmission apparatus for transmitting the phase-coherent signal, the base station (BS) additionally provides a receiver apparatus for receiving the phase-coherent signal from the transponder and a distance-determining apparatus (TRXMIX, Demod) for determining the distance between the base station (E) and the transponder (TR; S) is characterized by the fact that the oscillator in the transponder is activated with the received signal to generate a quasi-phase-coherent signal and data is additionally modulated onto this signal.

A base station (E) for determining the distance of a transponder (TR; S) provides a distance-determining apparatus (RXMIX, BP1, Meas, Demod) or delivers signals to such where the base station E provides a mixer TRXMIX for mixing the quasi-phase-coherent signal received from the transponder (TR; S) and the instantaneous oscillator or transmission signal into a hybrid signal.

The distance-determining apparatus TRXMIX, BP1, Demod, Meas is advantageously adapted as such to form the hybrid signal ZFSig' or $(S_{mix}(t))$ by way of the equation $$s_{mix}(t)=\cos(t-\omega_{sw}+\tau\cdot(\omega_c+\omega_{sw}))$$

where $\omega_c$ is the center frequency of the base station oscillator HFVCO, $\omega_{sw}$ is the modulation frequency of the transmission signal SH or $s_{tx}(t)$ of the base station E, t is the time in the time interval 0–Ts and $\tau$ is the propagation time of the signals over the distance between the base station E and the transponder (TR; S).

The distance-determining apparatus TRXMIX, BP1, Demod, Meas advantageously provides a demodulation apparatus Demod for reducing or eliminating changes over time in the voltage of the hybrid signal $(s_{mix}(t))$ in the time interval (0–TS) between switching the measurement on and off in the base station E to generate a measuring signal $(s_{mess}(t))$.

The distance-determining apparatus TRXMIX, BP1, Demod, Meas also advantageously provides a demodulation apparatus Demod for mixing down the hybrid signal $(s_{mix}(t))$, particularly with a frequency near or identical to a clock frequency $f_{mk}$, to a frequency substantially lower than the clock frequency $f_{mk}$ for switching the oscillator HFVCO in the transponder (TR) on and off cyclically and subsequent filtering out of high frequency components to generate a measurement signal $s_{mess}(t)$.

The distance-determining apparatus TRXMIX, BP1, Demod, Meas can furthermore be adapted to modulate the modulation frequency $\omega_{sw}$ of the transmission signal $s_{tx}(t)$ of the base station E, particularly as defined by $$\omega_{sw} = \frac{2 \cdot \pi \cdot B \cdot t}{T}$$

where T is a time duration over which the frequency is detuned over the bandwidth B.

The distance-determining apparatus TRXMIX, BP1, Demod, Meas can also be adapted to form the resulting FMCW measurement signal $s_{messfmcw}(t)$ by way of the equasion $$s_{mess_{fmcw}}(t) = \cos\left(\omega_c \cdot \tau + \frac{2 \cdot \pi \cdot B \cdot t \cdot \tau}{T} + \frac{\pi \cdot B \cdot t \cdot T_S}{T}\right) \cdot \frac{\sin\left(\frac{\pi \cdot B \cdot t \cdot T_S}{T}\right)}{\left(\frac{\pi \cdot B \cdot t}{T}\right)}$$

The distance-determining apparatus TRXMIX, BP1, Demod, Meas can furthermore be adapted to determine the distance from the measurement frequency $f_{mess}$ which corresponds to the normal FMCW (Frequency Modulated Continuous Wave) measurement frequency shifted by a frequency component $\Delta b = B*T_S/(2\ T)$.

The distance-determining apparatus TRXMIX, BP1, Demod, Meas can also be aligned to perform a Fourier transformation of the amplitude-weighted measurement signal $s_{messfmcw}(t)$ in the frequency range with the result that edges of a left and right sideband of at least one square-wave function produced determine the distance between the base station E and the transponder (TR; S).

A transponder (TR; S) for determining its distance from a base station E appropriately provides a signal-generating apparatus for generating an oscillator signal S or $s_{osz}(t)$ from a transponder received signal sH or $e_{rx}(t) = s_{tx}(t-T/2)$ with an active phase-coherently activated oscillator (SHFO) and a switch apparatus (TGEN) for switching the oscillator on and off cyclically, particularly for generating the oscillator signal as defined by $$s_{rx}(t) = s_{osz}\left(t - \frac{\tau}{2}\right) = \sin(\omega_{osz} \cdot t - (\omega_c + \omega_{sw}) \cdot \tau + \phi_0)$$

where $\omega_c$ is the center frequency of the oscillator HFVCO of the base station E, $\omega_{sw}$ is the modulation frequency of the transmission signal $s_{tx}(t)$ of the base station E, t is the time, $\tau$ is the propagation time of the signals over the distance between the base station E and the transponder (TR) and $\phi_0$ is any desired phase offset.

In the case of such a distance-determining system, modulation is additionally used for switching the oscillator (SHFO) in the transponder (TR; S) on and off for transmitting additional information or data from the transponder to the base station E, as is described in the foregoing on the basis of various exemplary embodiments.

If the distance-determining apparatus in the base station provides a mixer TRXMIX for mixing the quasi-phase-coherent signal received from the transponder and the instantaneous transmission signal into a hybrid signal, a measurement signal is produced which provides at least 2 spectral components whose frequency interval or phase interval constitutes a measure of the distance from the base station to the transponder where this measure is independent of the switching-on and switching-off frequency of the oscillator in the transponder.

Modulating or detuning the modulation frequency of the transmission signal of the base station ultimately results in a measurement signal which provides spectral components which are expressed by cosine functions that are amplitude-weighted. Advantageously, measurement even of small distances down to a value of zero is made possible by way of a frequency shift inherent to the described transponder. The additionally possible implementation of a Fourier transformation of the amplitude-weighted measurement signal in the frequency range results in spectral lines (sidebands) with a rectangular-shaped envelope where the outermost edges of a left and right sideband lying nearest to the modulation frequency determine the distance between the base station and the transponder.

As a result of the fact that the modulation frequency for switching the oscillator in the transponder on and off is not necessarily included in the analysis of the distance in the base station, it can be used to transmit additional information or data from the transponder to the base station.

In the case of the aforesaid applications, it is very advantageous as a rule if the radio frequency modules and particularly the transponder TR are constructed as small and compact as possible. In the case of access systems or payment systems where the transponder TR is customarily worn by a person on his or her body, the constructional size of the transponder TR, in the form of a key or a payment/entry card for example, decisively determines the convenience of wearing it, for example.

Radio frequency modules are customarily constructed on printed circuit boards made of organic materials, e.g., Teflon®-based or epoxy-based. Particularly in the case of low radio frequencies, e.g. 1 GHz-10 GHz, the desire for small constructional sizes can only be fulfilled to a very limited extent due to the coupling between the wavelength and the structure size with these materials. An alternative comprises circuits on thin-film ceramics, but their production is very cost-intensive.

Both the transponder TR and also the base station BS can therefore be implemented particularly advantageously as an LTCC (Low Temperature Cofired Ceramic) module or by using LTCC modules. Radio frequency structures on an LTCC basis are compact firstly due to the relatively high dielectric coefficient of LTCC but secondly also because the possibility exists of implementing the circuit in multi-layer technology. The manufacture of LTCC is inexpensive. Additionally, LTCC modules are capable of being placed in a manner which is viable in a mass production context.

Since the entire RF circuit or critical sub-components are capable of being integrated completely in an LTCC module, these integrated LTCC modules can be placed like standard SMT (Surface Mount Technology) devices on very inexpensive standard printed circuit boards which for their part are not necessarily RF-compliant. The possibility naturally also exists of combining the technologies and constructing LTCC sub-modules on printed circuit boards made of organic materials but which can then be substantially smaller.

Figure 8:
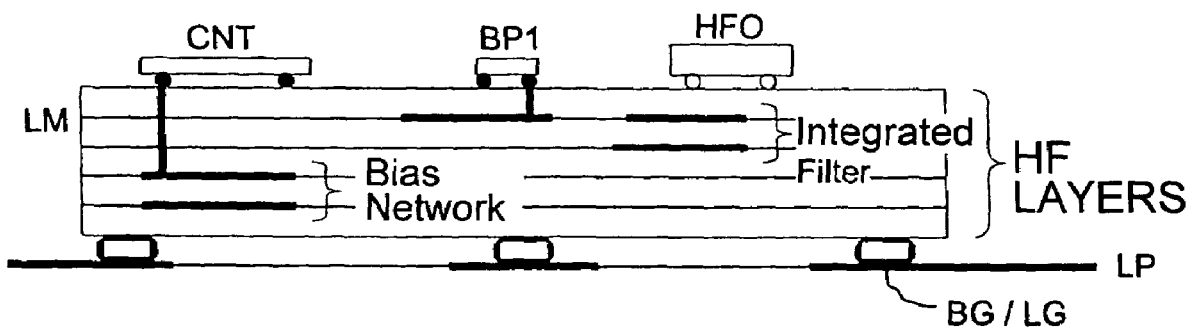
FIG. 8 is a diagram of an LTCC module with such a device.

An advantageous transponder TR with LTCC RF modules is shown in FIG. 8. Integrated on the LTCC module LM are a radio frequency oscillator HFO, a bandpass filter BP1 for filtering out interference modulation components which are produced by the switching (on/off) of the oscillator HFO with the clock pulse of a clock generator TGEN, and a radio frequency splitter or meter CNT, for example. The oscillator HFO is regulated to its target frequency by way of a control loop, to which a split-down clock pulse or the meter count is fed, as is customary in the case of embodiments as defined in FIG. 7, for example. Only digital, comparatively low-frequency signals are led out from the LTCC module LM, apart from the connection for the antenna, with the result that this module LM can be integrated without difficulty and inexpensively in the remaining circuit.

The possible construction of the LTCC module is shown in schematic form in FIG. 8. In this respect, the RF circuit consists of a plurality of strata or RF layers. Devices which cannot be integrated into the inner layers, primarily semiconductors, for example, are placed on the upper side of the LTCC substrate. As a placement technique, SMT (Surface Mount Technology) placement or Flip Chip placement, which are known techniques, are particularly appropriate. The LTCC module LM itself can be mounted on a standard printed circuit board LP with what is referred to as Ball-Grid or Land-Grid BG/LG technology, for example.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" "critical". Numerous modifications and adaptations will be readily apparent to those skilled in this art without departing from the spirit and scope of the present invention.

The invention claimed is:

1. A transceiver device configured for generating an oscillator signal based on a base signal, comprising:
    an input configured for receiving the base signal;
    an output configured for transmitting the oscillator signal generated;
    an oscillator configured for actively constructing the oscillator signal with oscillations, the oscillator configured to be activated in a quasi-phase-coherent manner aided by a control signal generated by a clock generator and configured to be activated in a quasi-phase-coherent manner with respect to the base signal via the base signal for generating the oscillator signal;
    an oscillator configured for generating an oscillating signal;
    a mixer comprising an input to which the oscillating signal of the oscillator is applied;
    at least one interface configured for at least one of transmitting and receiving signals, the interface being connected to the mixer;
    at least one output of the mixer configured for outputting a signal received from the at least one interface and mixed down with the oscillating signal; and
    a signal and data processing apparatus connected to the mixer;
    the clock generator being configured for activating the oscillator;
    the device being usable as a receiver if the oscillator is not modulated by the clock generator, and the device being usable as a transmitter if the oscillator is modulated by the clock generator in its quasi-phase-coherent activation capability and in at least one of its amplitude, phase, and frequency.

2. A transceiver device as claimed in claim 1, further comprising:
    data insertion apparatus comprising a phase control apparatus configured to modulate data onto the oscillator signal by using a switchable phase shift.

3. The transceiver device according to claim 1, wherein the signal and data processing apparatus is configured to either:
    apply a received base signal to the oscillator and insert data or a data signal into the oscillating signal for subsequent output via the interface as data insertion apparatus; or
    recover the inserted data from a signal received via the interface and mixed down by way of the mixer as the data recovery apparatus.

4. A receiver device configured for receiving and processing a quasi-phase-coherent received signal which was generated and transmitted by a device of claim 2, comprising:
    a separation apparatus configured for removing signal components of an oscillator from the quasi-phase-coherent received signal by using a base signal of a receiver-side oscillator;
    a data recovery apparatus configured to recover inserted data;
    a transmission mixer comprising:
    an oscillator input configured for applying the signal generated by the oscillator;
    a base signal output configured for outputting the signal generated by the oscillator as a base signal through the transmission mixer and for transmitting the base signal to an actual data transmitter station;
    a received signal input configured for applying the received signal; and
    a mixed-down signal output configured for outputting a mixed-down received signal, where the base signal output for and the received signal input coincide.

5. A receiver device configured for receiving and processing a quasi-phase-coherent received signal which was generated and transmitted by a device of claim 2, comprising:
    a separation apparatus configured for removing signal components of an oscillator from the quasi-phase-coherent received signal by using a base signal of a receiver-side oscillator;
    a data recovery apparatus configured to recover inserted data;
    a demodulator comprising:
    a phase comparator, comprising:
    an input to which a received signal originating from the mixer of the receiver is fed;

a further input; and an output at which recovered data is output;

the demodulator further comprising:

a frequency discriminator configured to impose a frequency-dependent phase shift on an input signal, comprising:

an input to which the received signal originating from the mixer of the receiver is fed; and an output connected to the further input of the phase comparator at which an output signal of the frequency discriminator is fed.

6. A receiver device configured for receiving and processing a quasi-phase-coherent received signal which was generated and transmitted by a device of claim 2, comprising:

a separation apparatus configured for removing signal components of an oscillator from the quasi-phase-coherent received signal by using a base signal of a receiver-side oscillator;

a data recovery apparatus configured to recover inserted data;

a demodulator comprising:

at least one phase-coupled control-loop circuit for frequency demodulation.

7. A receiver device configured for receiving and processing a quasi-phase-coherent received signal which was generated and transmitted by a device of claim 2, comprising:

a separation apparatus configured for removing signal components of an oscillator from the quasi-phase-coherent received signal by using a base signal of a receiver-side oscillator;

a data recovery apparatus configured to recover inserted data;

a demodulator comprising:

at least two different band pass filter/detector sequences having outputs that are applied to both an adder for outputting a measure for the signal level and also a differential amplifier followed by a series-connected comparator for outputting reconstructed data.

8. A transponder system, comprising:

at least one transmitter;

at least one receiver;

the transponder system configured to determine a distance between the transmitter and the receiver by using a base signal transmitted from the receiver to the transmitter and a signal transmitted back from the transmitter to the receiver which is quasi-phase-coherent with respect to the base signal, at least one of the following being provided in the transmitter or the receiver:

a data insertion apparatus which is adapted for inserting data or a data signal into a corresponding oscillator signal to be transmitted;

a data recovery apparatus configured to recover data inserted into received signals;

a demodulator configured to recover original data;

a measuring apparatus configured to determine the distance between the transmitter and the receiver;

an oscillator comprising a variable oscillator with regard to frequency, with which frequency-modulated signals suitable for measuring distance are capable of being generated; and a receiver mixer which is configured to mix received signals with signals of the oscillator and which comprises an output for outputting signals resulting therefrom, the output being connected to the demodulator and the measuring apparatus.

9. A method for transmitting data, comprising:

generating an oscillator signal based on a base signal;

activating an oscillator in a quasi-phase-coherent manner with respect to the base signal by way of the base signal;

oscillating the oscillator in response to the activation, the oscillator actively generating a quasi-phase-coherent oscillator signal to be transmitted by way of the oscillation;

inserting data or a data signal in the quasi-phase-coherent oscillator signal to be transmitted during or following its generation;

applying the oscillator signal to an input of a mixer;

transmitting signals via at least one interface that is connected to the mixer;

outputting a signal on an output of the mixer that was received from the interface and mixed down with the oscillating signal;

processing the signal with a signal and data processing apparatus connected to the mixer; and activating the oscillator with a clock generator.

10. A method for transmitting data with a device for generating an oscillator signal based on a base signal, comprising:

actively constructing an oscillator signal with an oscillator configured to actively constructing the oscillator signal by way of oscillations;

inputting the base signal at an input;

outputting the oscillator signal at an output;

generating a control signal by a clock generator;

activating the oscillator in a quasi-phase-coherent manner with the aid of the control signal with respect to the base signal by way of the base signal for generating the oscillator signal; and switching the device between use as a receiver and as a transmitter;

when the device is used as a receiver, not modulating the oscillator by the clock generator;

when the device is used as a transmitter, modulating the oscillator by the clock generator in its quasi-phase-coherent activation capability and in at least one of its amplitude, phase, and frequency applying the oscillator signal to an input of a mixer;

receiving or transmitting signals via at least one interface that is connected to the mixer;

outputting a signal on an output of the mixer that was received from the interface and mixed down with the oscillating signal;

processing the signal with a signal and data processing apparatus connected to the mixer; and activating the oscillator with a clock generator.

* * * * *